United States Patent [19]

Laine

[11] Patent Number: 5,174,975

[45] Date of Patent: Dec. 29, 1992

[54] METHOD OF PREPARING METAL CARBIDES, NITRIDES, BORIDES AND THE LIKE

[75] Inventor: Richard M. Laine, Seattle, Wash.

[73] Assignee: SRI International, Menlo Park, Calif.

[21] Appl. No.: 435,775

[22] Filed: Nov. 13, 1989

Related U.S. Application Data

[60] Division of Ser. No. 279,599, Dec. 5, 1988, Pat. No. 4,895,709, which is a continuation-in-part of Ser. No. 119,303, Nov. 6, 1987, Pat. No. 4,789,534, which is a continuation of Ser. No. 900,592, Aug. 26, 1986, abandoned, which is a continuation-in-part of Ser. No. 727,524, Apr. 26, 1985, abandoned.

[51] Int. Cl.⁵ .................... C01B 25/08; C01B 35/04; C01B 21/06; C01B 21/08

[52] U.S. Cl. .................... 423/289; 423/297; 423/406; 423/409; 423/410; 423/411; 423/412

[58] Field of Search ............... 423/289, 297, 406, 409, 423/410, 411, 412

[56] References Cited

U.S. PATENT DOCUMENTS

| | | |
|---|---|---|
| 2,922,819 | 1/1960 | Chatt et al. |
| 3,064,021 | 11/1962 | Wilkinson |
| 3,070,615 | 12/1962 | Seyferth |
| 3,155,532 | 11/1964 | Basile |
| 3,979,500 | 9/1976 | Sheppard et al. ............... 423/289 |
| 4,080,431 | 3/1978 | Moss |
| 4,333,915 | 1/1982 | Iwai |
| 4,333,916 | 6/1982 | Iwai |
| 4,426,366 | 1/1984 | McCandlish et al. |
| 4,800,183 | 1/1989 | Quinby ............... 423/411 |

OTHER PUBLICATIONS

Yajima, S., et al., *Nature* 266 (7): pp. 522-523.
Chemical Abstract No. 94,774.
Sugiyama, *J. Electrochem. Soc.* (Nov. 1975), pp. 1545-1549.
Watchman, Jr. et al., *Chem. Eng. Prog.*, (Jan. 1986), pp. 39-46.

*Primary Examiner*—John S. Maples
*Assistant Examiner*—Philip Tucker
*Attorney, Agent, or Firm*—Irell & Manella

[57] ABSTRACT

A process is provided for the preparation of metals, metal carbides, nitrides, borides, silicides, sulfides and phosphides by low temperature pyrolysis of a selected organometallic precursor. The precursor, in addition to containing organic ligands, contains the metal M, which is a transition metal or tin, and the element X (C, N, B, Si, S, or P), which may be bound directly to M, contained within the ligands, or both. The process enables one to provide surface coatings or shaped articles of metals, metal carbides, nitrides, and the like.

7 Claims, 3 Drawing Sheets

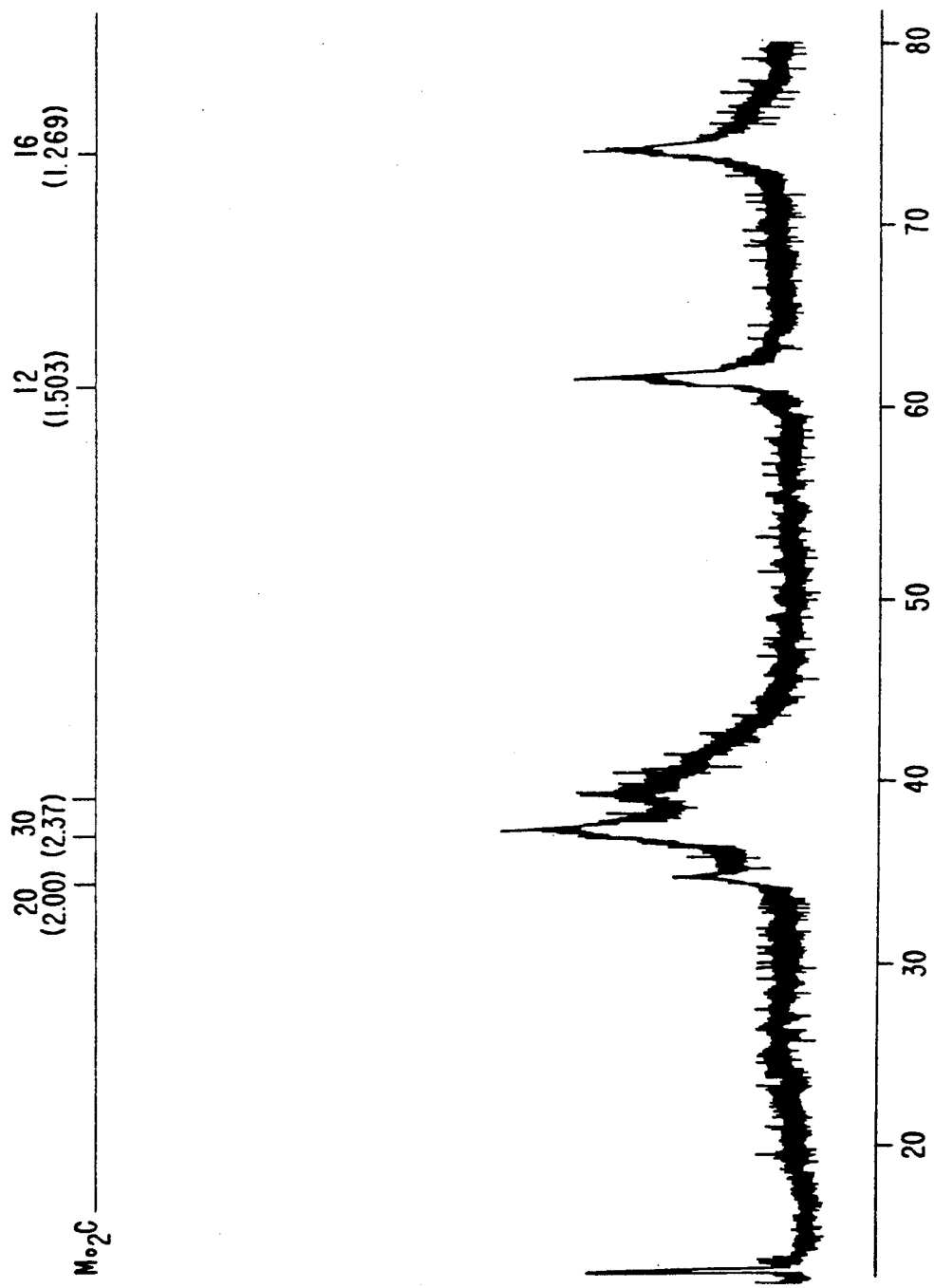

METHOD OF PREPARING METAL CARBIDES, NITRIDES, BORIDES AND THE LIKE

CROSS-REFERENCE TO RELATED APPLICATIONS

This application is a divisional of U.S. Pat. application Ser. No. 07/279,599, filed Dec. 5, 1988, now U.S. Pat. No. 4,895,707, which is a continuation-in-part of U.S. Pat. application Ser. No. 07/119,303, filed Nov. 1987, now Pat. No. 4,789,534 which is a continuation of U.S. Pat. application Ser. No. 06/900,592, filed Aug. 26, 1986, which is a continuation-in-part of U.S. Pat. application Ser. No. 06/727,524, filed Apr. 16, 1985.

TECHNICAL FIELD

This invention relates generally to processes for the preparation of metals, metal carbides, nitrides, silicides, borides and phosphides, and more particularly, relates to such processes which involve low-temperature pyrolysis of selected organometallic precursors.

BACKGROUND

Metal carbides, such as tungsten carbide, are used in making a variety of hard and/or high temperature materials. Metal carbides are made conventionally by blending carbon with metal powder and carburizing the metal at elevated temperatures. This procedure produces a metal carbide powder whose properties. (high hardness, high melting) are not amenable to permitting the material to be readily manipulated into other forms such as coatings, fibers, or shaped objects.

Pat. application Ser. No. 727,524, incorporated herein by reference, addresses the problem of how to readily produce metal carbides, nitrides, and the like in the form of coatings, fibers or shaped objects. The application generally describes a procedure for pyrolyzing tractable organometallic precursors in which organic ligands are bonded to the metal. The tractability of the precursor enables it to be placed in the desired form before it is pyrolyzed.

U.S. Pat. application Ser. No. 900,592, derived from the '524 application and also incorporated by reference herein, involves the use of a particular class of organometallic precursors, polynuclear metal amides, that contain two or more metal atoms. These compounds were found unexpectedly to be metal carbide precursors. In this regard, prior workers reported in *J. Electrochem. Soc.*, (1975) 122:1545–1549 that mononuclear metal dialkylamides which contain one metal atom thermally decomposed in the gas phase to produce metal nitrides. It was expected, therefore, that the polynuclear metal amide precursor would yield metal nitrides rather than metal carbides. It was further found that metal carbides in which the carbon is in excess and is bound covalently to the metal may be produced by pyrolyzing certain metal amides containing two or more metal atoms. Such metal carbides are believed to be novel. Like the precursors of the '524 application, the transition metal amide precursors of the '592 application may be readily converted to coatings or shaped articles of metal carbide using low temperature pyrolysis.

The art directly relating to metal carbides in which there is excess carbon is exemplified by U.S. Pat. No. 3,865,745 and *Refractory Hard Metals: Borides, Carbides, Nitrides and Silicides*, Schwarzkopf, P., et al, MacMillen and Co., NY, (1953). The patent describes the preparation of metal carbide microspheres by heating in the presence of steam microspheres of ion exchange resins that have been pretreated with metal ion solution. The patent indicates that the carbon in the microspheres can be in molar excess depending upon the heating conditions. It is believed that the carbon in this product is not present in the form of a covalently bound species, but is instead present in the form of excess carbon (graphite) in solid solution. Also, in view of the presence of steam in the process, the product is contaminated by oxycarbide to greater or lesser extent depending on the heating conditions.

The present application relates to certain aspects of the precursors, processes and products described in patent applications Ser. Nos. 727,524 and 900,592, in particular: (1) a process for preparing metal nitrides, borides, silicides, sulfides and phosphides via low-temperature pyrolysis of selected precursors; and (2) that process the process of the '524 application; and (3) transition metal carbides produced by pyrolysis of polynuclear transition metal amides according to the process of the '392 application.

BRIEF DESCRIPTION OF THE DRAWINGS

FIG. 3 is an X-ray powder diffraction spectrum of $Mo_2(NMe_2)_6$ pyrolyzed according to the method of Example 6.

SUMMARY OF THE INVENTION

Figure 1:
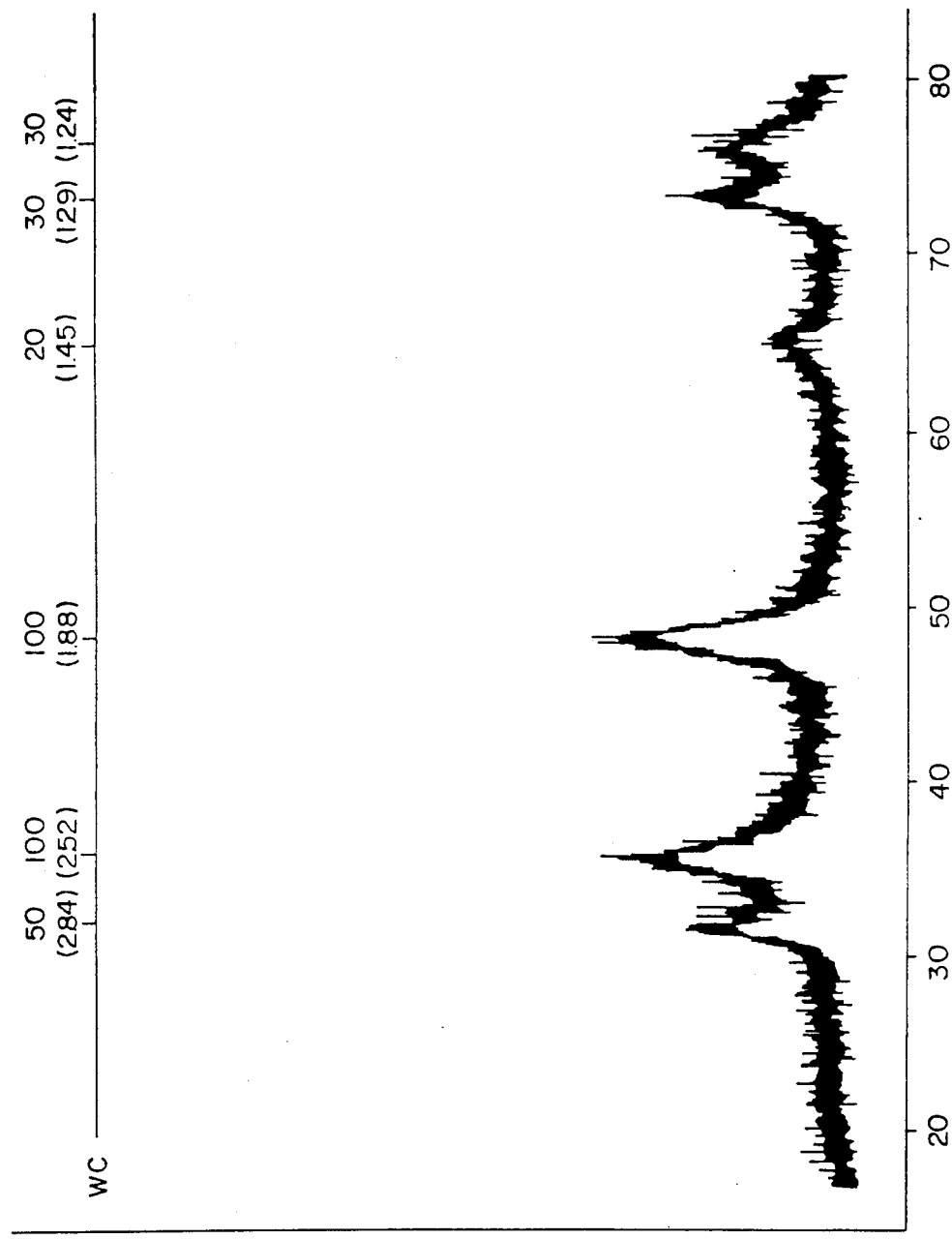
FIG. 1 is an X-ray powder diffraction spectrum of $Cp_2W_2(CO)_4$ DMAD pyrolyzed according to the method of Example 1.

It is thus an object of the present invention to provide improved methods of producing metals, metal nitrides, metal carbides, silicides, sulfides, borides, phosphides, and the like, which overcome the above-mentioned disadvantages of the prior art.

It is another object of the invention to provide a low-temperature route to the preparation of metals, metal carbides, nitrides, silicides, sulfides, borides, phosphides, and the like, which involves low-temperature pyrolysis of a selected or organometallic precursor.

It is still another object of the invention to provide such a process in which the precursor is a tractable polynuclear compound.

It is yet another object of the invention to provide such a process in which the precursor is free of metal-halogen and metal-oxygen bonds and may contain one or more multiple bonds.

It is a further object of the invention to provide metals, metal carbides, nitrides, silicides, borides, phosphides, and the like, prepared by the above-mentioned process.

It is still a further object of the invention to provide transition metal carbides by low-temperature pyrolysis of selected transition metal amides.

Additional objects, advantages and novel features of the invention will be set forth in part in the description which follows, and in part will become apparent to those skilled in the art on examination of the following, or may be learned by practice of the invention.

In one aspect, the invention relates to a method of producing a product $M_aX_b$ wherein M represents one or more metals selected from the group consisting of transition metals and tin, X represents one or more elements selected from the group selected from the group consisting of N, B, Si, S and P, and a and b represent the atomic proportions of M and X, and b may be zero, comprising the steps of, in sequence:

(a) providing a precursor to $M_aX_b$ that is non-volatile upon pyrolysis and which comprises an organometallic complex, the complex including one or more metal atoms M which may be the same or different, and wherein each of the metal atoms M is bound to an organic ligand, the organometallic complex further containing the element X either directly bound to one or more of the metal atoms M or contained within the ligands or both;

(b) optionally either:
  (i) dissolving the precursor in an organic solvent to give a precursor solution, the solvent selected such that the precursor can be dissolved to a concentration at which the precursor can be dissolved to a concentration at which the precursor solution has a viscosity sufficient to allow extrusion into a desired form; or
  (ii) melting the precursor;

(c) shaping the precursor into a desired form; and (d) pyrolyzing the shaped precursor, at a temperature in the range of 500° to 950° C., to give $M_aX_b$ as a residue substantially free of organic materials.

In another aspect, the invention relates to the products $M_aX_b$ which may be prepared by the aforementioned process. Where the precursors are polynuclear, the $M_aX_b$ products may be "shaped" articles such as rods, fibers, or the like.

In still another aspect, the invention relates to transition metal carbides prepared by a process which comprises pyrolyzing a tractable transition metal amide of the formula $M_x(NR^1R^2)y$ where M is selected from the group consisting of transition metals and tin, x is an integer and is equal to or greater than 2, $R^1$ and $R^2$ are the same or different and are hydrogen, lower alkyl, trimethylsilyl, or ethylene, with the proviso that both $R^1$ and $R^2$ are not hydrogen, and y is an integer equal to the valence of the $M_x$ unit, under nonoxidizing conditions at a temperature at which a carbon-containing group of the amido group of the amide undergoes chemical reaction with a metal atom of the amide to form at least one covalent carbon-to-metal bond. The inventor herein postulates that the method may be useful in the preparation of metal nitrides as well.

The advantages of the invention include the following:

(1) Lower temperatures in the preparation of the metal compound or alloy $M_aX_b$ wherein M represents the metal or metals, X represents the combining element or elements and the subscripts a and b represent the atomic proportions of M and X;

(2) A simplified procedure;

(3) Greater control over the combining proportions, a and b;

(4) More facile methods of application of $M_aX_b$ to end products; and (5) Potential routes to materials or material morphologies that have heretofore been impossible or difficult to prepare.

DETAILED DESCRIPTION OF THE INVENTION

Definitions

As used herein, the term "transition metal" means an element which has a partially filled d or f shell. The term encompasses elements of atomic number 21 through 29 (scandium through copper), 39 through 47 (yttrium through silver), 57 through 79 (lanthanum through gold) and all elements from atomic number 89 (actinium) on. Preferred transition metals for the purpose of the invention are those of Group VIB of the Periodic Table. The metal atom M in the precursor is either tin or a transition metal as defined herein.

As used herein the term "tractable" means that the designated precursor is sufficiently soluble, meltable or malleable that it can be formed into desired shapes either by itself, in solution, or melt or mixture, as the case may be, at relatively low temperatures (i.e., below about 200° C.).

Precursor Structure

The present invention involves low-temperature pyrolysis of selected organometallic precursors that are tractable as defined hereinabove. The use of such tractable precursors enables preparation of metals, metal carbides, metal nitrides, and the like, as coatings or as shaped articles e.g., fibers and rods.

The precursors contain the metal atom "M" associated with the element "X" and with ligands. "M" represents one or more metals selected from the group consisting of transition metals and tin, i.e., the precursor may contain only one type of metal atom or it may include two or more types of metal atoms. M may be, for example, any one or more of the following elements: Ti, W, Hf, Fe, Cr, Ta, V, Nb, Ti, Pd, Ru, Rh, Co, Ag and "X" represents one or more elements selected from the group consisting of C, N, B, Si, S and P. X may be bound or coordinated directly to M and/or it may be contained in one or more ligands, i.e., there may be both X and L(X) species bound to M, wherein L(X) indicates a carbon-containing ligand that also contains the element X. The direct M-X bonds, if present, may be ionic, or they may be covalent sigma or pi bonds. While not essential, it is preferred that there be multiple bonds between the "M" and "X" moieties of the precursor to increase the likelihood that the two elements will retain a bonding interaction during pyrolysis.

The ligands "L" are carbon-containing, and are selected such that upon pyrolysis of the precursor, the ligands will be lost, with the exception of any "X" atoms contained therein. The ligands are preferably free of halogen or oxygen bound to the metal M, i.e., the precursor itself is preferably free of M-halogen and M-oxygen bonds. Where b is 0, i.e., when it is desired to prepare the metal M in pure form, the aforementioned limitation does not apply.

The precursor is one that is generally tractable, i.e., as noted above, either malleable at room temperature, readily meltable at low temperatures, or soluble in common solvents. In addition, clearly, the precursor is such that it cannot be volatilized at the temperatures that will be used in the pyrolysis. The choice of ligands will typically dictate these physical properties of the precursor.

The precursor may be in the form of a polymer. A polymer has the advantage of being more easily shaped, spun, etc. The following schemes illustrate potential routes to such polymers.

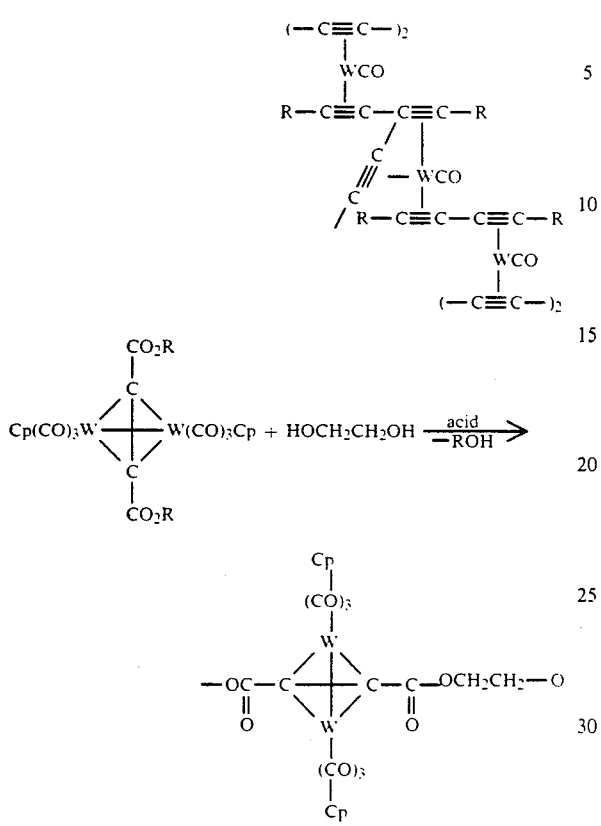

If a polymeric precursor is used, it must have the correct rheology, i.e., an intrinsic viscosity of at least about 1 poise. A polymer may be used at the outset, or it may be formed in the early stages of pyrolysis.

The precursor may be selected such that upon pyrolysis, the metal M will remain in pure form rather than associated with the element X in $M_aX_b$. This will typically involve pyrolysis under a reducing atmosphere such as $H_2$ or $N_2$. An example of such a precursor is $Co_6(CO)_{16}$, described in *Advances in Organometallic Chemistry*, vol. 14, at page 287 (1976).

In an alternative embodiment, X is another metal rather than C, N, Si, S, B or P, and the pyrolysis product is an alloy. The use of precursors of the present invention to produce alloys is particularly useful where the alloy has a high melting point and is to be deposited on a substrate which is low melting or which could be damaged by contact with molten alloy.

In still another embodiment of the invention, as described in patent application Ser. No. 900,592, the precursors are transition metal amides of the general formula:

$$M_x(NR^1R^2)_y$$

where M is as defined earlier, x is an integer and is equal to or greater than 2, preferably equal to 2, $R^1$ and $R^2$ are the same or different and are hydrogen, lower alkyl (1 to 4 carbon atoms, preferably straight-chain), trimethylsilyl, or ethylene, with the proviso that both $R^1$ and $R^2$ are not hydrogen, and y is an integer equal to the valence of the $M_x$ unit. In this case, $M_x$ is preferably a Group VIB metal dimer, oligomer or polymer and most preferably ditungsten or dimolybdenum. Alkyl radicals represented by $R^1$ and $R^2$ include methyl, ethyl, propyl, isopropyl and butyl. Preferred alkyl radicals are methyl and ethyl. When $R^1/R^2$ represent ethylene they form cyclic structures with the metal and nitrogen or the amide.

Examples of preferred metal amides are hexakis(methylamido) dichromium, hexakis(dimethylamido) dichromium, hexakis(ethylamido) dichromium, hexakis(diethylamido) dicromium, hexakis(methylethylamido) dichromium, hexakis(propylamido) dichromium, hexakis(isopropylamido) dichromium, hexakis(methylpropylamido) dichromium, hexakis(dipropylamido) dichromium, hexakis(butylamido) dichromium, hexakis(methylamido) ditungsten, hexakis(dimethylamido) ditungsten, hexakis(ethylamido) ditungsten, hexakis(diethylamido) ditungsten, hexakis(methylethylamido) ditungsten, hexakis(propylamido) ditungsten, hexakis(methylpropylamido) ditungsten, hexakis(ethylpropylamido) ditungsten, hexakis(butylamido) ditungsten, hexakis(dibutylamido) ditungsten, hexakis(methylamido) dimolybdenum, hexakis(dimethylamido) dimolybdenum, hexakis(ethylamido) dimolybdenum, hexakis(diethylamido) dimolybdenum, hexakis(methylethylamdido) dimolybdenum, hexakis(propylamido) dimolybdenum, hexakis(methylpropylamido) dimolybdenum, hexakis (ethylpropylamido) dimolybdenum, hexakis(butylamido) dimolybdenum, hexakis(dibutylamido) dimolybdenum, tetrakis(diamidoethane) dichromium, tetrakis(diamidoethane) ditungsten, and tetrakis(diamidoethane) dimolybdenum.

Examples of other metal amides are hexakis(dimethylamido) discandium, hexakis(dimethylamido) dititanium, hexakis(dimethylamido) divanadium, hexakis(dimethylamido) dimanganese, tetrakis(diethylamido)-bis-($\mu$-ethylamido) dizirconium, tetrakis(dimethylamido)-bis-($\mu$-ethylamido) dirhodium, tetrakis(dimethylamido)-bis-($\mu$-ethylamido) ditantalum, hexakis(diethylamido)-tris-($\mu$-trimethylsilylamido) dilanthanum, and hexakis(diethylamido)-tris-($\mu$-trimethylsilylamido) diactinium.

The metal amide precursors may be prepared from lithium amides and the corresponding metal chlorides or by reaction of a silylamide with a metal chloride or fluoride as is known in the art.

Examples of suitable precursors are set forth in the following tables:

TABLE I

| Carbide Precursors | |
|---|---|
| Precursor | Literature Reference |
| $Fe_5(CO)_{15}C$ | Adv. Organometallic Chem. (1976) 14: 285, 288–289 |
| $[Fe_6(CO)_{16}C]^{2-}$ | Adv. Organometallic Chem. (1976) 14: 285, 288–289 |
| $[Co_8(CO)_{18}C]^{2-}$ | Adv. Organometallic Chem. (1976) 14: 285, 288–289 |
| $Ru_6(CO)_{17}C$ | Adv. Organometallic Chem. (1976) 14: 285, 288–289 |

TABLE I-continued

| Carbide Precursors | |
|---|---|
| Precursor | Literature Reference |
| Ru<sub>6</sub>(CO)<sub>14</sub>(C<sub>6</sub>H<sub>12</sub>)C | Adv. Organometallic Chem. (1976) 14: 285, 288-289 |
| [Rh<sub>6</sub>(CO)<sub>15</sub>C]<sup>2-</sup> | Adv. Organometallic Chem. (1976) 14: 285, 288-289 |
| Rh<sub>8</sub>(CO)<sub>19</sub>C | Adv. Organometallic Chem. (1976) 14: 285, 288-289 |
| Rh<sub>12</sub>(CO)<sub>25</sub>(C<sub>2</sub>) | Adv. Organometallic Chem. (1976) 14: 285, 288-289 |
| [Rh<sub>15</sub>(CO)<sub>28</sub>(C<sub>2</sub>)]<sup>-</sup> | Adv. Organometallic Chem. (1976) 14: 285, 288-289 |
| Ru<sub>5</sub>C(CO)<sub>15</sub> | Adv. Organometallic Chem. (1976) 14: 285, 288-289 |
| Os<sub>5</sub>C(CO)<sub>15</sub> | J. Organometallic Chem. (1973) 57: C82-C83 |
| Co<sub>2</sub>(CO)<sub>6</sub>RC≡CR (R = alkyl, aryl) | Ibid. (1983) 259: 253 |
| Ru<sub>6</sub>C(CO)<sub>16</sub>C<sub>6</sub>H<sub>2</sub>(CH<sub>3</sub>)<sub>3</sub> | Adv. Organomet. Chem. (1976) 14: 285 |
| Ru<sub>6</sub>C(CO)<sub>17</sub> | Adv. Organomet. Chem. (1976) 14: 285 |
| Cp<sub>2</sub>VC C—C(CH<sub>3</sub>)<sub>3</sub> | J. Organometallic Chem. (1984) 265: 249-255 |
| Alkylidynetricobalt- nonacarbonyl complexes | J. Organometallic Chem. (1976) 162: 89-98 |
| Cp<sub>2</sub>W<sub>2</sub>Ir<sub>2</sub>(CO)<sub>6</sub>(μ<sub>3</sub>-CPh)(μ-C<sub>3</sub>Ph) | Organometallics (1984) 3: 158 |
| Cp<sub>2</sub>Ti(PhC≡CPh)<sub>2</sub> | J. Organometallics (1983) 243: 157 |

TABLE II

| Alloy Precursors | |
|---|---|
| Precursor | Literature Reference |
| [CpYb]Co(C<sub>5</sub>H<sub>4</sub>R)<sub>2</sub>(μ<sub>3</sub>-CO)<sub>4</sub> | J. Chem. Soc. Chem. Commun. (1984) 809 |
| [Re<sub>4</sub>Cu<sub>2</sub>H<sub>16</sub>L<sub>6</sub>](PF<sub>6</sub>)<sub>2</sub> | JACS (1983) 105: 5137 |
| Au<sub>2</sub>Ru<sub>4</sub>(μ<sub>3</sub>-H)<sub>2</sub>(CO)<sub>12</sub>(PPh) | J. Chem. Soc. Chem. Commun. (1983) 1332 |
| Ln[Co(CO)<sub>4</sub>]<sub>2</sub> [Ln = Sm/Eu/Yb] | Adv. Organometallic Chem. (1976) 19: 285, 288, 289 |
| [Co<sub>5</sub>Ni<sub>2</sub>(CO)<sub>14</sub>] | Adv. Organomet. Chem. (1976) 14: 285 |
| [Co<sub>4</sub>Ni<sub>2</sub>(CO)<sub>14</sub>]<sup>2-</sup> | Adv. Organomet. Chem. (1976) 14: 285 |
| [Mo<sub>2</sub>Ni<sub>3</sub>(CO)<sub>16</sub>]<sup>2-</sup> | Adv. Organomet. Chem. (1976) 14: 285 |
| [W<sub>2</sub>Ni<sub>3</sub>(CO)<sub>16</sub>]<sup>2-</sup> | Adv. Organomet. Chem. (1976) 14: 285 |
| (Cp)<sub>2</sub>NbH<sub>2</sub>ZnCp | Organometallics (1984) 3: 156 |

TABLE III

| Nitride Precursors | |
|---|---|
| Precursor | Literature Reference |
| H<sub>2</sub>Ru<sub>3</sub>(CO)<sub>9</sub>NH | J. Chem. Soc. Chem. Commun. (1984) 186 |
| [FeRu<sub>3</sub>N(CO)<sub>12</sub>]<sup>-</sup> | JACS (1984) 106: 4799 |
| NOs(CH<sub>2</sub>SiMe<sub>3</sub>)<sub>4</sub> | JACS (1984) 106: 7493 |
| [W(NPh)Me<sub>3</sub>]<sub>2</sub>(μ-η<sup>1</sup>,η<sup>1</sup>-NH<sub>2</sub>NH<sub>2</sub> (μ-η<sup>2</sup>,η<sup>2</sup>NHNH) | JACS (1984), 106: 4633 |

TABLE IV

| Boride Precursors | |
|---|---|
| Precursor | Literature Reference |
| (H)Fe<sub>3</sub>(CO)<sub>9</sub>(μ<sub>3</sub>-BH<sub>4</sub>) | JACS (1984), 106: 4633 |
| HFe<sub>4</sub>(CO)<sub>12</sub>BH<sub>2</sub> | Organometallics (1983) 2: 825 |
| (C<sub>4</sub>H<sub>4</sub>B—Ph)Ru(CO)<sub>3</sub> | Angew. Chem. Int. Ed. (1983) 22: 996 |
| V(C<sub>5</sub>H<sub>5</sub>B—CH<sub>3</sub>)<sub>2</sub> | J. Organometallics (1984) |

TABLE IV-continued

| Boride Precursors | |
|---|---|
| Precursor | Literature Reference |
| | 265: 225 |

TABLE V

| Silicide Precursors | |
|---|---|
| Precursor | Literature Reference |
| tetracarbonyl [1,2-ethanediylbis-[dimethylsilylene]osmium | Inorg. Chem. (1974) 13:511 |

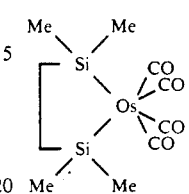

| tetracarbonyl [1,2-ethanediylbis-[dimethylsilylene]ruthenium | Inorg. Chem. (1974) 13:511 |
|---|---|

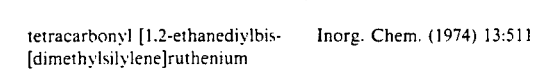

| (Me<sub>3</sub>Si)<sub>2</sub>Fe(CO)<sub>4</sub> | J. Organometallic Chem. (1974) 69:383 |
| (Me<sub>3</sub>Si)<sub>2</sub>Os(CO)<sub>4</sub> | JACS (A) (1970), 3147 |
| (Me<sub>3</sub>Si)<sub>2</sub>Ru(CO)<sub>4</sub> | JACS (A) (1969), 2259 |
| (Me<sub>3</sub>SiCH<sub>2</sub>)Ti(NMe<sub>2</sub>)<sub>3</sub> | J. Organometallic Chem. (1976) 108:69 |
| (Me<sub>3</sub>Si)<sub>2</sub>Fe(CO)<sub>7</sub> | Z. Naturforsch., B (1971) 26:162 |
| (C<sub>2</sub>H<sub>5</sub>)(SiMe<sub>3</sub>)Mo(CO)<sub>3</sub> | J. Chem. Soc. (A) (1970), 2594 |
| (Me<sub>3</sub>SiCH<sub>2</sub>)<sub>2</sub>Ti(NMe<sub>2</sub>)<sub>2</sub> | J. Organometallic Chem. (1976) 108:69 |
| (Me<sub>3</sub>SiN)Ru<sub>3</sub>(CO)<sub>10</sub> | Inorg. Nucl. Chem. Lett. (1974) 10:941 |

TABLE VI

| Sulfide Precursors | |
|---|---|
| Precursor | Literature Reference |
| Ru<sub>3</sub>S<sub>2</sub>(CO)<sub>9</sub> | J. Chem. Soc., Chem. Commun. (1979), 719 |
| Di-2-thienyl zinc | Dokl. Akad. Nauk. USSR, Ser. Sci. Khim. (1964) 155: 299 |
| (Me<sub>2</sub>N)<sub>3</sub>S<sub>6</sub>Ti(C<sub>5</sub>H<sub>5</sub>) | Inorg. Chem. (1978) 17: 3498 |
| [Zn(SBu<sup>t</sup>)<sub>x</sub>(S)<sub>y</sub>(SH)<sub>x</sub>]<sub>n</sub> | Inorg. Chem. (1988) 27: 3267 |

TABLE VII

| Phosphide Precursors | |
|---|---|
| Precursor | Literature Reference |
| P(OMe<sub>3</sub>)<sub>2</sub>Ru(CO)<sub>3</sub> | J. Chem. Soc. (A)(1971), 16 |
| (PMe<sub>3</sub>)<sub>2</sub>Ru(CO)<sub>3</sub> | J. Chem. Soc., Dalton Trans. (1980), 1771 |
| (PPh<sub>3</sub>)(C<sub>4</sub>H<sub>4</sub>)<sub>2</sub>Ru | Nouv. J. Chim. (1977) 1: 141 |
| (PPh<sub>3</sub>)(C<sub>5</sub>H<sub>5</sub>)Ru(CO)<sub>2</sub> | J. Chem. Soc., Dalton Trans. (1975), 1710 |
| (PPh<sub>3</sub>)(C<sub>5</sub>H<sub>5</sub>)(CONH<sub>2</sub>)Ru(CO) | Z. Naturfirsch. (B) (1979) 34: 1477 |
| Ph<sub>4</sub>H<sub>4</sub>Ru<sub>4</sub>(CO)<sub>10</sub> | JACS (1977) 99: 7384 |

Preparation of Metal Carbides and Other $M_aX_b$ Species

The precursors as defined in the preceding section, particularly the meal amide precursors, are generally soluble in organic solvents such as methylene chloride, pentane, benzene, diphenylether, acetonitrile, chloroform, methanol, toluene, DMSO, DMF, N-methylpyrrolidone, hexane, pentane, THF, glycerol, and the like.

Solutions or melts of the precursors may be applied to substrate surfaces by spraying, dipping, or brushing, to provide $M_aX_b$ coatings after pyrolysis. If the solution or melt is sufficiently viscous and non-volatile, it may be extruded in the form of rods, fibers or other shaped bodies, prior to pyrolysis, to give the final product in a desired, predetermined form. For the preparation of shaped articles, polymeric, i.e., polynuclear precursors are typically preferred.

Pyrolysis is conducted under nonoxidizing conditions, e.g., in the presence of nonoxidizing gases such as nitrogen, ammonia, argon, or the like, at temperatures at which the carbon-containing ligands of the precursor react with the metal to form one or more carbon-to-metal covalent bonds. The particular temperatures used in the pyrolysis will depend upon the precursor involved and will normally be in the range of about 100° C. to about 1000° C., preferably about 200° C. to 950° C., still more preferably about 500° C. to 950° C.

With regard to pyrolysis of transition metal amides, specifically, the relative amounts of metal, nitrogen, and carbon in the amide precursor are believed to direct the formation of the carbide rather than nitride in the pyrolysis and to affect the atom ratio of carbon to metal in the resulting carbide. It is believed that only amides that contain a multiplicity of metal atoms provide precursors for carbides.

The present process thus involves pyrolyzing a carbon-containing organometallic precursor under nonoxidizing conditions at a temperature selected so that one of the carbon-containing groups undergoes reaction to form at least one covalent metal-carbon bond. The method allows for relatively low conversion temperatures in the preparation of the metal carbide, nitride, or the like, due to the presence of covalent bonds in the precursor. These bonds reduce the energy required to convert to final products by the energy of the preformed bonds. The method also provides for greater control over the combining proportions, an overall relatively simplified procedure, and potential routes to phases or crystalline morphologies which are not otherwise accessible by standard, high temperature processing techniques. These are advantages heretofore unrealized by the art.

In addition, the present process enables the preparation of metal carbides, metal nitrides, and the like, in a variety of forms, i.e., fibers, coatings or the like. It has not previously been possible, using conventional metallurgical or ceramic processing techniques, to form transition metal carbides, nitrides, etc., into such shapes as they are extremely hard, intractable materials; the instant process which involves a tractable or soluble precursor overcomes this limitation in the art. The lower carbon content achieved in the metal carbides in particular allows for increased stability with regard to oxidation, that is, the likelihood of oxidation is substantially reduced.

The following specific examples will serve to illustrate the practice and advantages of the invention.

These examples are not intended to limit the scope of the invention in any manner.

EXAMPLE 1: PREPARATION OF TUNGSTEN CARBIDE AND OXYCARBIDE

A. Compound 1

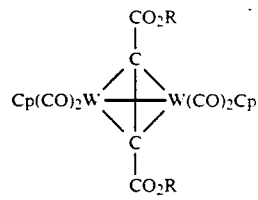

was prepared as described by Ford and Laine, *J. Orcanometallic Chem.* (1977) 124:29. Cp represents the cyclopentanienyl group. Precursor 1 was placed in a nickel boat and pyrolyzed in an atmosphere of argon at 750° C. for 20 minutes. Conversion to $W_2C$ resulted.

The tungsten carbide so provided is useful for hard, corrosion and wear resistant surfaces and can be used on cutting edges for machining tools.

FIG. 1 of the drawings shows the X-ray powder diffraction pattern of the pyrolysis product.

B. The process of part A is repeated using a quartz boat. Conversion to tungsten oxycarbide, $W_2(C,O)$ will result. The difference between the nickel and quartz containers is believed to be due to the fact that quartz supplies oxygen to form the oxycarbide.

Tungsten oxycarbide is useful to coat alloys and as electrode material in electrochemical reactions.

EXAMPLE 2: PREPARATION OF TITANIUM DIBORIDE

The organometallic precursor, $Cp_2Ti(BH_4)_2$, was prepared by the method described by A.S. Lee, K. Isagawa, and Y. Otsuji, *Chem. Lett.* 1984, 363–366, by reaction of $Cp_2TiCl_2$ with excess $NaBH_4$ in THF. The resulting purple complex (purified by filtration and vacuum removal of solvent) was very air sensitive. The solid material was transferred to both nickel and quartz pyrolysis tubes under argon and into a pyrolysis oven. After heating at 850° for 20 min., X-ray powder analysis showed that both $TiB_2$ and $TiC$ were present. Very small particle sizes were obtained, i.e., less than about 30 Å.

EXAMPLE 3: PREPARATION OF RUTHENIUM SILICIDE

The precursor $[(C_2H_5)_3Si]_2Ru_3(CO)_{10}$, is prepared by the method of Georg Suss-Fink described in his Habilitionsschrift entitled "Stochiometrische und Katalytische Aktivierungsreaktionen an dreikernegen Klustern des osmiums und Rutheniums", University of Bayreuth, 1983.

Pyrolysis at 800° C. for 2 hours yields ruthenium silicide, RuSi.

EXAMPLE 4: PREPARATION OF METAL NITRIDES, SULFIDES AND PHOSPHIDES

Metal nitride, sulfide and phosphide precursors may be any of those set forth in Tables III, VI and VII. Upon pyrolyzing at 500° C. to 950° C. for 2 hours an iron nitride, sulfide or phosphide will result.

EXAMPLE 5

Figure 2:
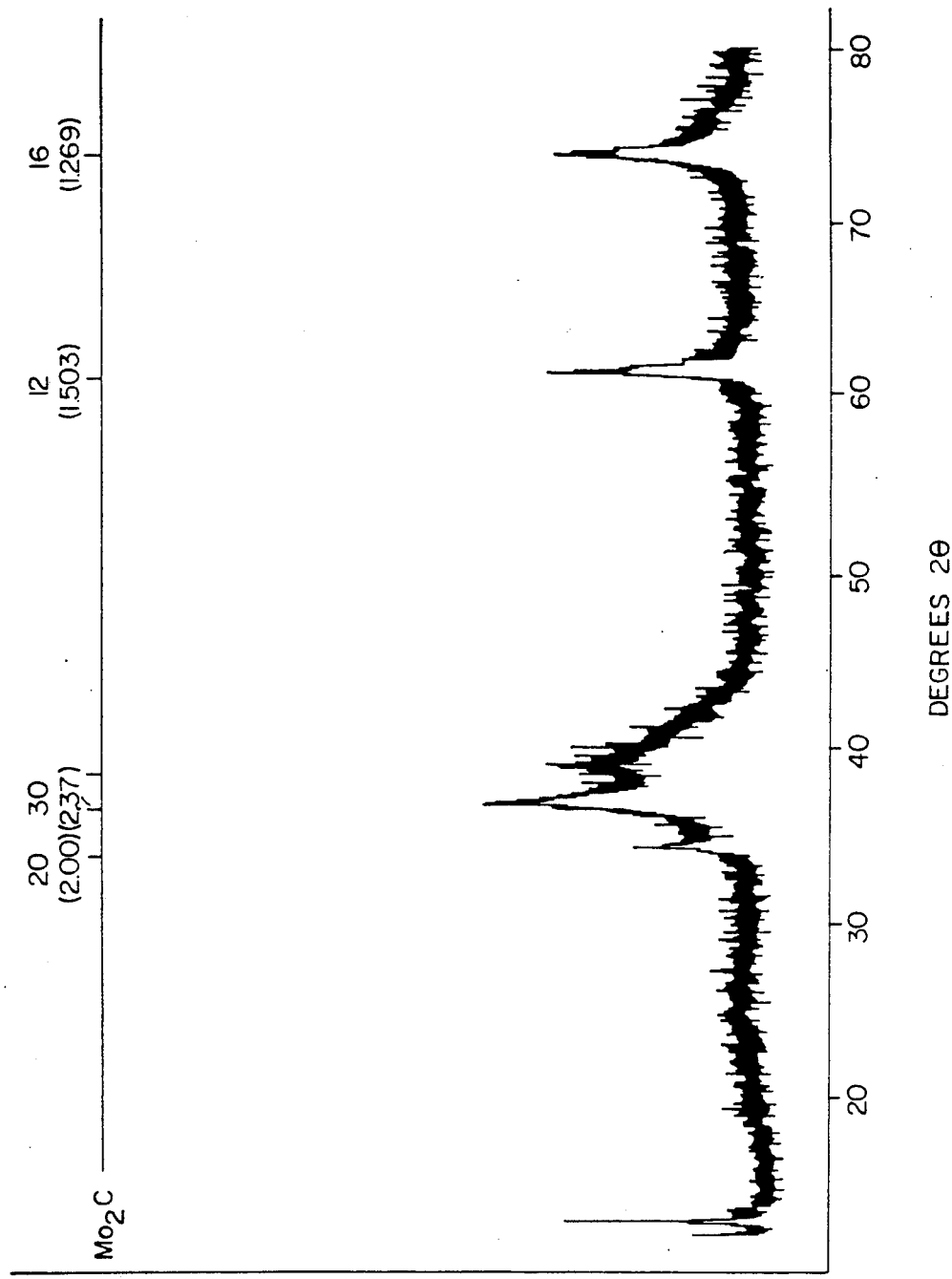
FIG. 2 is an X-ray powder diffraction spectrum of $W_2(NMe_2)_6$ pyrolyzed according to the method of Example 5.

Nickel-coated stainless steel tubes were charged with 0.07 g of hexakis(dimethylamido) ditungsten ($W_2(NMe_2)_6$) under an argon, nitrogen, or ammonia atmosphere and pyrolyzed at 800° C. for 25 minutes. A representative X-ray powder diffraction pattern of the pyrolysis product was made and is shown in FIG. 2. This pattern indicates that the product has the crystal structure of WC. Repeated elemental analyses showed the following: W, 90.87; C, 8.79; N, 0.39.

EXAMPLE 6

Example 5 was repeated except that 0.07 g of hexakis(dimethylamido) dimolybdenum was used in place of hexakis(dimethylamido) ditungsten. The X-ray powder diffraction pattern of the pyrolysis product of this example is shown in FIG. 4. The pattern is consistent with that expected for molybdenum carbide. Repeated elemental analyses showed the following: Mo, 83.14; C, 16.72; N, 0.34.

Modifications of the above-described modes for carrying out the invention that are obvious to those of skill in the art are intended to be within the scope of the following claims.

I claim:

1. A method of producing a product $M_aX_b$ wherein M represents one or more metals selected from the group consisting of transition metals and tin, X is nitrogen or boron, and a and b represent the atomic proportions of M and X, comprising the steps of, in sequence:
   (a) providing an organometallic precursor to $M_aX_b$ that is non-volatile upon pyrolysis, said precursor including one or more metal atoms M which may be the same of different, and wherein each of said metal atoms M is bound to an organic ligand, said organometallic precursor further containing the element X either directly bound to one or more of said metal atoms M or contained within said ligands or both;
   (b) optionally either:
      (i) dissolving said precursor in an organic solvent to give a precursor solution, the solvent selected such that the precursor can be dissolved to a concentration at which the precursor solution has a viscosity sufficient to allow extrusion into a desired form; or
      (ii) melting said precursor;
   (c) shaping said precursor into a desired form; and
   (d) pyrolyzing said form, at a temperature in the range of 50020 C. to 950° C., to provide $M_zX_b$ substantially free of organic materials.

2. The method of claim 1, wherein X is nitrogen.

3. The method of claim 1, wherein X is boron.

4. The method of claim 1, wherein the precursor is polymeric.

5. The method of claim 1, wherein the precursor is free of metal-halogen and metal-oxygen bonds.

6. The method of claim 1, wherein there are multiple bonds in the precursor.

7. The method of claim 1, wherein said organic solvent is selected from the group consisting of $CH_2Cl_2$, $CHCl_3$-/, $CH_3OH$, $CH_3CH_2OH$, diethyl ether, glyme, diglyme, tetrahydrofuran, freons, benzene, toluene, dimethylsulfoxide, diemthylformamide, N-methyl pyrrolidone, hexane and pentane.

* * * * *